Patented Dec. 22, 1925.

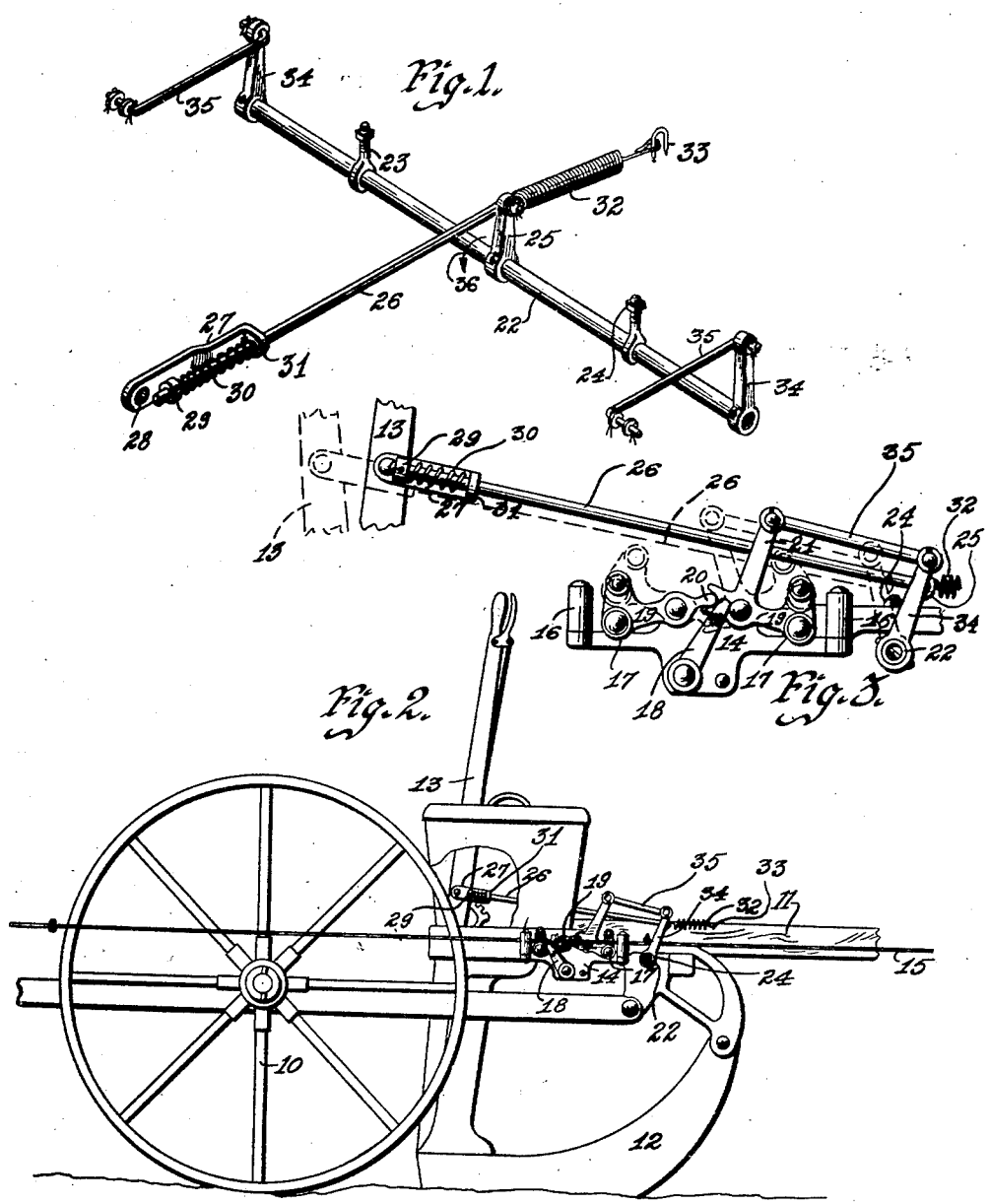

1,566,960

UNITED STATES PATENT OFFICE.

WILLIAM H. GROVER, OF BURT, IOWA.

CHECKROW-WIRE RELEASE FOR CORN PLANTERS.

Application filed September 4, 1924. Serial No. 735,784.

*To all whom it may concern:*

Be it known that I, WILLIAM H. GROVER, a citizen of the United States, residing at Burt, in the county of Kossuth and State of Iowa, have invented a certain new and useful Checkrow-Wire Release for Corn Planters, of which the following is a specification.

The object of my invention is to provide an automatic check row wire release for corn planters of simple, durable and comparatively inexpensive construction.

More particularly, my invention relates to an attachment adapted to be secured to an ordinary corn planter and operatively connected to a lever from which the runners of the corn planter are controlled so that upon the operation of the control lever for raising the runners, I am able to release the check row wire from its rollers or guides.

Still a further object is to provide yielding means connected to my attachment and forming a part thereof for automatically returning the parts to original position after they have been operated.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of my improved automatic check row wire release for corn planters.

Figure 2 is a side elevation of the same, showing it installed upon a corn planter; and Figure 3 is an enlarged side view of my attachment operatively connected to the tripping mechanism of a planter, one position of the parts being shown in dotted lines.

In the accompanying drawings, I have used the reference numeral 10 to indicate a traction wheel of an ordinary corn planter, which comprises a frame 11, a runner 12 and a suitable control lever 13 operatively connected with the runner 12 for raising it or rendering it inoperative when desired.

Secured to the frame 11 is a tripping mechanism 14 through which the check row wire 15 travels.

The tripping mechanism 14 includes a pair of vertical rollers 16 and pairs of horizontally disposed rollers 17 which serve as guides for the check row wire 15.

A tripper arm 18 is arranged to be tripped by the check row wire 15 in the ordinary manner.

Each of the pairs of rollers 17 is mounted upon a pivoted frame 19. The pivoted frames 19 are connected together by a ball and socket or tongue and groove joint 20.

One of the frames 19 has an upward extension 21 thereon to which my attachment is secured, as will hereinafter be more fully set forth.

In order to release the check row wire from the rollers 16 and 17 it is necessary to move the upward extension 21 to the position shown in dotted lines in Figure 3 of the drawings and by so doing, the frames 19 with the rollers 17 thereon, will be moved to the position shown in dotted lines in that figure at which time, the check row wire 15 will be spaced above the upper ends of the rollers 16 and can thereby be released from the tripping mechanism of the corn planter.

The parts just described are of the ordinary construction used in corn planter mechanisms.

My improved attachment, which is designed to automatically operate the tripping mechanism for releasing the check row wire includes a transverse bar or shaft 22, which is mounted in suitable eyebolts or bearings 23. The eyebolts 23 extend through the frame 11 and are secured thereto by the nuts 24.

The shaft 22 is capable of rotary movement within the bearings or eyebolts 23.

Fixed to the shaft 22 near the center thereof is an arm 25. The arm 25 has a link 26 pivotally secured thereto.

The link 26 is slidably extended through a bracket 27, which is pivotally fixed to the control lever 13, by a suitable bolt or the like passing through the opening 28.

A collar 29 is fixed to the end of the link 26 so as to retain a spring 30 on the link 26 between the collar 29 and the short right angle extension 31 forming a part of the bracket 27.

Fixed to the link 26 is a spring 32 which has its free end connected to the frame 11 of the corn planter by a staple or the like 33.

The spring 32 is stronger than the spring 30 and retains the shaft 22 and arm 25 in a pre-determined position, as will hereinafter be described.

Secured to the shaft 22 near the ends thereof are the arms 34, which have links 35 pivotally connected therewith.

The links 35 extend rearwardly and are pivotally connected to the upper extensions 21 on one of the frames 19.

In a two row corn planter there are two sets of mechanisms, like the one shown in Figure 3 of the drawings.

The spring 32 will pull the arm 25 forwardly, thus moving the shaft 22 to such position as will cause the pivoted frames 19 to remain in the position shown in solid lines in Figure 3 of the drawings.

When it is desired to raise the runners 12 and render them inoperative, it is also desirable to release the check row wire and by the use of my attachment, I am able to release the check row wire by moving the lever 13 rearwardly, which causes the arm 25 to swing in the direction indicated by the arrow 36, thus moving the links 35 rearwardly and imparting such movement to the extensions 21.

Movement of the extensions 21 to the position shown in dotted lines in Figure 3 of the drawings, will in turn raise or swing the frames 19 to position where the check row wire may be released therefrom.

The coil spring 30 on the link 26 will first become compressed when the lever 13 is moved rearwardly due to the fact that the spring 32 is stronger than the spring 30, and thereafter further rearward movement of the lever 13, will operate against the spring 32 for moving the parts to the position shown in dotted lines in Figure 3.

When it is desired to return the parts to original position, then the lever 13 is moved forwardly at which time, the spring 32 will function for returning all of the parts to original or operative position.

The inter-positioning of the coil spring 30 between the connection of the link 26 to the lever 13, gives such a connection that the lever 13 can be moved the required distance for raising the runners 12, and the extension 21 moved a less distance for releasing the check row wire.

The spring 30 also eliminates the danger of exerting too great a pull or too far a movement of the extension 21 because the coil spring 30 compensates for any differences in the movement of the lever 13, as compared to the movement of the extensions 21.

It will be seen that I have provided an automatic check row wire release for corn planters operated by the control lever, which is used for regulating the runner of the corn planter itself.

Some changes may be made in the construction and arrangement of the various parts of my invention, without departing from the real spirit and purpose of my invention and it is my intention to cover by my claim, any modified forms of structure or use of mechanical equivalents, which may be reasonably included within its scope.

I claim as my invention:

An automatic check row wire release for corn planters, comprising in combination with a control lever for the runners of the corn planter and a check row wire mechanism, a transverse shaft rotatably mounted in bearings on the frame of said planter, an arm on said shaft, a link connection between said arm and said control lever, a spring interposed between the lever and said link and forming a part of said link connection, a link connection between said shaft and the check row wire mechanism whereby movement of the lever will impart movement to the check row wire mechanism, and a second spring secured to said arm for normally retaining said shaft and said check row mechanism in a predetermined position.

Des Moines, Iowa, August 12, 1924.

WILLIAM H. GROVER.